US012637603B2

(12) United States Patent
Ikeda et al.

(10) Patent No.: US 12,637,603 B2
(45) Date of Patent: May 26, 2026

(54) COLD STORAGE MATERIAL

(71) Applicant: SHARP KABUSHIKI KAISHA, Osaka (JP)

(72) Inventors: Yusuke Ikeda, Osaka (JP); Yuka Utsumi, Osaka (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 301 days.

(21) Appl. No.: 18/241,470

(22) Filed: Sep. 1, 2023

(65) Prior Publication Data

US 2024/0076537 A1     Mar. 7, 2024

(30) Foreign Application Priority Data

Sep. 7, 2022     (JP) ................................. 2022-141894

(51) Int. Cl.
*C09K 5/06*          (2006.01)
(52) U.S. Cl.
CPC .............. C09K 5/066 (2013.01); C09K 5/063 (2013.01)
(58) Field of Classification Search
CPC .......... C09K 5/066; C09K 5/063; C09K 5/06; Y02E 60/14
See application file for complete search history.

(56) References Cited

U.S. PATENT DOCUMENTS

2013/0086924 A1     4/2013 Farone et al.
2017/0107414 A1*   4/2017 Machida ................ C09K 5/063

FOREIGN PATENT DOCUMENTS

CN          104662119 A   *  5/2017  .............. C09K 5/08
JP          H02269180 A     11/1990
JP          2017-078163 A    4/2017

OTHER PUBLICATIONS

CN 104662119 A_Machine Translation (Year: 2015).*
Solubility Table for Water at Temperature retrieved from https://www.sigmaaldrich.com/US/en/support/calculators-and-apps/solubility-table-compounds-water-temperature?srsltid=AfmBOoqx15NMeRh Jn5dVB6bK6VJIh5Z9ftWGLDIQJC96ISgmLtPVrLQ6 on Sep. 4, 2025 (Year: 2025).*

* cited by examiner

*Primary Examiner* — Anthony J Green
*Assistant Examiner* — Anastasia A. Kuvayskaya
(74) *Attorney, Agent, or Firm* — ScienBiziP, P.C.

(57)     ABSTRACT

The disclosure is a cold storage material containing: a cold storage material main agent formed from water and a melting point adjuster; and a freezing point adjuster. The melting point adjuster includes a plurality of types of inorganic salts and an organic compound. Anions of the plurality of types of inorganic salts are all chlorine, and cations of the plurality of types of inorganic salts include at least sodium. The freezing point adjuster is a salt having a functional group that is identical to a cation included in any of the plurality of types of inorganic salts, and the salt has a temperature dependence of saturated solubility in pure water that decreases by 30% or more at a water temperature from 20° C. to 0° C.

11 Claims, 3 Drawing Sheets

TIME (h)

COLD STORAGE MATERIAL

TECHNICAL FIELD

The disclosure relates to an air conditioner. In particular, the disclosure relates to a cold storage material for maintaining a temperature range of −18° C. or lower, which is a cold storage condition for frozen foods. The present application claims the rights of priority from JP 2022-141894 filed in Japan on Sep. 7, 2022, the content of which is hereby incorporated by reference in the present application.

BACKGROUND ART

In recent years, slow progress in the reduction of carbon dioxide in the transport sector compared to other sectors has become a problem. One means for suppressing carbon dioxide emissions from truck transport, which accounts for approximately forty percent of carbon dioxide emissions in the transport sector, is to reduce re-delivery through widespread use of "delivery to a designated location" (a service of delivering packages or the like in a non-face-to-face manner to a location (such as in front of an entrance, a delivery bag, a home delivery box, a garage, or a storage room) designated in advance by the receiver). This is because a 1% reduction in the re-delivery rate is anticipated to result in a reduction of approximately 20000 tons of carbon dioxide.

Meanwhile, the e-commerce market such as online supermarkets is expanding, and in the middle of this growth, the consumption amount of frozen foods that are easy to prepare and can be stored for a long time is also expanding. Transport of these goods is characterized by the frequent delivery of small lots, and thus deliveries using, instead of large refrigerator trucks, small commercial vehicles not equipped with cooling equipment are increasing.

In light of this social background, in order to maintain frozen foods at an appropriate temperature without using power, the need for a means to arrange dry ice or a pre-frozen refrigerant in a container having a thermal insulation property to maintain a predetermined temperature is increasing. Dry ice has commonly been used for frozen foods, but in recent years, there has been a chronic shortage of dry ice.

This is because dry ice is made from carbon dioxide that is a by-product of crude oil refining, and has been strongly impacted by the reduction in the amount of crude oil consumption due to the increased use of renewable energies. Thus, there is a need for a low temperature cold storage material that can keep frozen foods cool, in place of dry ice.

The commonly used cold storage materials are water-based cold storage materials near 0° C., but these are not suitable for keeping frozen foods cool. The Food Sanitation Act of Japan stipulates that frozen foods be constantly stored at a temperature of −15° C. or lower, and the food industry often sets voluntary standards for storage at −18° C. or lower. This is because the cold storage material near 0° C. cannot maintain such low temperature. One particular problem is that the firmness of high-grade ice cream with a high milk fat content cannot be maintained if the temperature is not maintained at −18° C. or lower or −20° C. or lower. Thus, various low temperature cold storage materials formed by adding various inorganic salts to water are being developed.

For example, JP 2017-078163 A discloses a latent heat cold storage material containing water, a crystalline powder, and at least one inorganic salt, wherein the crystalline powder is 1,3-diethylurea, the concentration of the 1,3-diethylurea is from 3 wt. % to 20 wt. %, and the latent heat cold storage material has a solidification initiation temperature of −29.5° C. or higher.

Even among cold storage materials, a supercooling phenomenon is significant with cold storage materials formed by adding metal salts to water. Cold storage materials keep target substances cool through an endothermic phenomenon during melting, so the cold storage material must be frozen before use. When the supercooling phenomenon is significant, a temperature environment that is significantly lower than the temperature at the time of melting is required for freezing. Commonly, a cold storage material freezer requires a temperature setting 10° C. below the melting point of the cold storage material.

Incidentally, power consumption increases as the temperature setting of a cooler of a freezer is lowered. A large difference between the calorific value at an available melting temperature and the amount of power for freezing is not preferable from the perspective of energy use. For this reason, the above-described technology to reduce the difference between the melting temperature and the freezing temperature of a cold storage material has been disclosed.

SUMMARY

However, with the known cold storage material compositions described above, there is still room for improvement with regard to the transport of frozen foods.

Thus, in view of the problems described above, the disclosure has been made to reduce the energy loss of a cold storage material and efficiently store frozen foods in cold storage conditions.

One aspect of the disclosure is a cold storage material including: a cold storage material main agent formed from water and a melting point adjuster; and a freezing point adjuster, wherein the melting point adjuster includes a plurality of types of inorganic salts and an organic compound, anions of the plurality of types of inorganic salts are all chlorine, cations of the plurality of types of inorganic salts include at least sodium, and the freezing point adjuster is a salt having a functional group that is identical to a cation included in any of the plurality of types of inorganic salts, the salt having a temperature dependence of saturated solubility in pure water that decreases by 30% or more at a water temperature from 20° C. to 0° C.

As described above, the disclosure provides a cold storage material that has a melting temperature suitable for a product to be cooled, a difference between a solidification initiation temperature at which freezing begins and the melting temperature is within 5° C., and the solidification initiation temperature is equal to or greater than a temperature setting of −35° C. of a commonly used cold storage material freezer. Frozen foods, particularly products to be cooled that need to be kept at a low temperature, such as ice creams and cakes with a large amount of fresh cream, can be kept cool for a long period of time.

DESCRIPTION OF EMBODIMENTS

Figure 1:
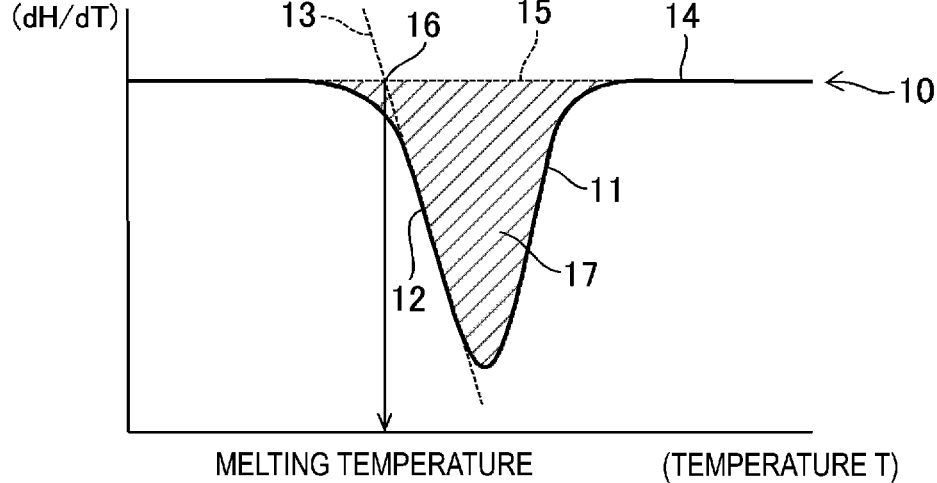
FIG. 1 is a diagram explaining a method of measuring a melting temperature and the amount of latent heat of a cold storage material according to an example.

Preferable embodiments of the disclosure will be described below in detail with reference to the drawings. Note that the present embodiment described below does not unduly limit the details of the disclosure described in the claims, and not all of the configurations described in the present embodiment are essential as solutions of the disclosure.

To solve the problems described above, the inventors have reached the disclosure of a cold storage material with a melting temperature of −26° C. to −32° C., a solidification initiation temperature of −35° C. or higher, and a difference between the solidification initiation temperature and the melting temperature within 5° C. The cold storage material according to the disclosure will be described below. Note that while it is not easy to strictly measure and define the solidification initiation temperature as a physical numerical value, in the disclosure, the solidification initiation temperature is defined by a below-described evaluation method in the Examples and the like. The solidification initiation temperature defined by this evaluation method can be provided as a reference temperature for operators using the cold storage material. The melting temperature is also a temperature that is defined in the Examples.

The cold storage material according to the disclosure contains: a cold storage material main agent formed from water and a melting point adjuster; and a freezing point adjuster.

The melting point adjuster includes a plurality of types of inorganic salts and an organic compound. The anions of the plurality of types of inorganic salts are all chlorine. The cations of the plurality of types of inorganic salts include at least sodium. The freezing point adjuster is a salt having a functional group that is identical to a cation included in any of the plurality of types of inorganic salts, and having a temperature dependence of saturated solubility in pure water that decreases by 30% or more at a water temperature from 0° C. to 20° C.

The cold storage material according to the disclosure is brought close to or into contact with a product to be cooled in a solidified state, and thereby keeps the product to be cooled, at a temperature near the melting point. Until the cold storage material completely melts, the cold storage material continues to keep the product to be cooled at the temperature near the melting point of the cold storage material. In addition, by having the composition described above, the cold storage material according to the disclosure is characterized by having a melting temperature in a range of −26° C. to −32° C., having a solidification initiation temperature in a range of −35° C. and higher, and having a difference between the melting temperature and the solidification initiation temperature of within 5° C.

The cold storage material according to the disclosure has a melting temperature suitable for the product to be cooled. It is obvious that a cold storage material having a melting temperature higher than the temperature required for the product to be cooled is unsuitable, but use of a cold storage material having an excessively low melting temperature results in energy loss. The cold storage material according to the disclosure has a melting temperature from −26° C. to −32° C. as a temperature particularly suitable for products such as ice cream and cakes having a large amount of fresh cream, which need to be kept at a low temperature. Thus, the cold storage material according to the disclosure is suitable for cold storage of a product to be cooled having a milk solids content of 3% or more, a product to be cooled having a milk solids content of 10% or more and a milk fat content of 3% or more, a product to be cooled having a milk solids content of 15% or more and a milk fat content of 8% or more, and a product to be cooled having a milk solids content of 25% or more and a milk fat content of 15% or more.

The cold storage material according to the disclosure has a small difference between the melting temperature and the solidification initiation temperature. An actual temperature setting of a cold storage material freezer is −35° C. or lower, and thus the solidification initiation temperature is −35° C. or higher.

In order to reduce the energy loss associated with freezing, the cold storage material according to the disclosure has a difference between the melting temperature and the solidification initiation temperature of within 5° C.

By having a composition as described above, the cold storage material according to the disclosure has a composition close to that of a eutectic crystal composition. Thus, in a liquid state, the cold storage material according to the disclosure is formed from a eutectic crystal of ice and the cold storage material of the above-described composition. Thus, when the cold storage material is solidified, a eutectic crystal of ice and the cold storage material of the above-described composition is formed. Thus, when the cold storage material is solidified, eutectic crystals of the above-described plurality of types of inorganic salts, the organic compound, and ice are mainly formed. When the cold storage material has a composition within the desirable range described above, solidification components other than the eutectic crystal are hardly formed.

Regarding the freezing point adjuster, examples of the salt having a temperature dependence of saturated solubility in pure water that decreases by 30% or more at a water temperature from 0° C. to 20° C. include di-sodium hydrogen phosphate dodecahydrate, sodium sulfate decahydrate, di-potassium hydrogen phosphate, potassium di-hydrogen phosphate, potassium sulfate, potassium aluminum sulfate dodecahydrate, aluminum ammonium sulfate dodecahydrate, sodium tetraborate, ammonium azide, thallium (I) azide, cobalt(II) nitrite, lead(II) chloride, potassium chlorate, barium chlorate, lithium chlorate, rubidium chlorate, sodium perchlorate, ammonium perchlorate, potassium perchlorate, potassium periodate, sodium periodate, potassium permanganate, zinc formate, sodium formate, lead(II) acetate, aluminum oxalate, potassium bromate, sodium bromate, ammonium nitrate, potassium nitrate, thallium nitrate, silver nitrate, lead nitrate, barium nitrate, copper(II) sulfate, sodium hydroxide, barium hydroxide, sodium carbonate, ammonium carbonate, potassium hydrogencarbonate, ammonium hydrogencarbonate, potassium thiosulfate, ammonium dichromate, potassium dichromate, potassium ferricyanide, potassium ferrocyanide, potassium fluoride, silver fluoride, thallium(I) iodide, potassium iodate, calcium iodate, barium sulfide, magnesium sulfate, triammonium phosphate, trisodium phosphate, ammonium hydrogen phosphate, potassium chromate, and boric acid.

The freezing point adjuster of the cold storage material according to the disclosure is a salt having a temperature dependence of saturated solubility in pure water that decreases by 50% or more at a water temperature from 20°

C. to 0° C., and a difference between a main melting point and the solidification initiation temperature is within 5° C. Preferably, the freezing point adjuster of the cold storage material of the disclosure is a salt having a saturated solubility of 11 g or less in pure water at a water temperature of 0° C. Note that the main melting point is the melting temperature defined in the Examples, and is obtained by differential scanning calorimetry measurements.

Preferably, the cations of the plurality of types of inorganic salts of the cold storage material of the disclosure include potassium, and the difference between the main melting point and the solidification initiation temperature of the cold storage material is within 5° C.

Preferably, the freezing point adjuster of the cold storage material according to the disclosure is a double salt containing an ammonium group and having a temperature dependence of saturated solubility in pure water that decreases by 40% or more at a water temperature from 20° C. to 0° C., and a difference between the main melting point of the cold storage material and the solidification initiation temperature is within 5° C.

Furthermore, preferably, the proportion of the cold storage material main agent in the cold storage material is from 1 to 18 wt. %, the proportion of the melting point adjuster is from 25 to 40 wt. %, the cations of the plurality of types of inorganic salts include potassium and an ammonium group, the cold storage material main agent includes from 5 to 25 wt. % of sodium chloride, from 1 to 6 wt. % of potassium chloride, and from 1 to 12 wt. % of ammonium chloride, a total amount of the plurality of types of inorganic salts in the cold storage material is from 13 to 35 wt. %, the organic compound is urea contained in an amount of 1 to 16 wt. %, and the main melting point of the cold storage material is from −27° C. to −32° C. In this manner, a ternary eutectic configuration achieves composition requirements in a wide concentration range because the anions are of the same type. When an inorganic salt with a different type of anion (in particular, the halogen bromine, or the like) is included in the composition, a reaction such as an ion exchange is likely to occur, and melting point equivalence may be inhibited in some cases.

Preferably, the freezing point adjuster in the cold storage material is contained in an amount of from 2 to 12 wt. % for 100 wt. % of the cold storage material main agent, and the solidification initiation temperature of the cold storage material is −35° C. or higher.

Preferably, a proportion of the cold storage material main agent in the cold storage material is from 8 to 12 wt. %, a proportion of the melting point adjuster is from 30 to 40 wt. %, the cations of the plurality of types of inorganic salts include an ammonium group, the cold storage material main agent includes from 10 to 18 wt. % of sodium chloride, and from 5 to 10 wt. % of ammonium chloride, and in particular, the sodium chloride is contained greater than the ammonium chloride, a total amount of the plurality of types of inorganic salts in the cold storage material is from 18 to 25 wt. %, the organic compound is urea contained in an amount of 8 to 12 wt. %, and the main melting point of the cold storage material is from −27° C. to −28° C. In the composition of the cold storage material, a greater amount of sodium chloride with a lower melting point is contained because the melting point of the sodium chloride eutectic crystal concentration is −21° C. and the melting point of the ammonium chloride eutectic crystal concentration is −15° C.

Preferably, the freezing point adjuster is contained from 3 to 12 wt. % for 100 wt. % of the cold storage material main agent, and the solidification initiation temperature of the cold storage material is −35° C. or higher.

Preferably, the proportion of the cold storage material main agent in the cold storage material is from 8 to 12 wt. %, the proportion of the melting point adjuster is from 20 to 30 wt. %, the cations of the plurality of types of inorganic salts include potassium, the proportion of sodium chloride in the cold storage material main agent is from 10 to 18 wt. %, the proportion of potassium chloride in the cold storage material main agent is from 3 to 6 wt. %, a total amount of the plurality of types of inorganic salts in the cold storage material is in a range of 15 to 20 wt. %, the organic compound is urea contained in an amount of 8 to 12 wt. %, and the main melting point of the cold storage material is from −26° C. to −27° C.

Preferably, the freezing point adjuster is contained from 3 to 12 wt. % for 100 wt. % of the cold storage material main agent, and the solidification initiation temperature of the cold storage material is −35° C. or higher.

The cold storage material with the preferable composition described above has a melting temperature suitable for a product to be cooled, energy loss of the cold storage material is reduced, and frozen foods can be kept cool more efficiency.

The cold storage material of the disclosure may contain a component other than the components described above. The cold storage material may contain, as the component other than the components described above, for example, at least one selected from the group consisting of a thickener, an antibacterial agent, and a dye.

EXAMPLES

The cold storage material according to the disclosure will be described in detail below using Examples and Comparative Examples.

Water, a melting point adjuster (such as ammonium chloride, potassium chloride, sodium chloride, or urea), and a freezing point adjuster (such as di-sodium hydrogen phosphate dodecahydrate, sodium sulfate decahydrate, di-potassium hydrogen phosphate, potassium di-hydrogen phosphate, potassium sulfate, potassium aluminum sulfate dodecahydrate, aluminum ammonium sulfate dodecahydrate, sodium tetraborate decahydrate, or calcium carbonate) were mixed and dissolved to thereby prepare cold storage materials according to the Examples and Comparative Examples as shown in Tables 1 and 3 to 7. Note that the total amount of the water and melting point adjuster was prepared to be 100 wt. %.

Here, a method of measuring the melting temperatures and amounts of latent heat of the cold storage materials according to the disclosure is explained. FIG. 1 is a diagram explaining the method of measuring the melting temperature and amount of latent heat of a cold storage material according to the Examples.

When the melting temperature and the amount of latent heat are to be measured, as illustrated in FIG. 1, a differential scanning calorimetry (DSC) curve 10 is obtained by subjecting the cold storage material to DSC measurements. The horizontal axis represents the temperature (T), and the vertical axis represents melting enthalpy per unit temperature (dH/dT). The temperature at an intersection point 16, between a straight line 13 obtained by linearly extrapolating a low temperature side 12 of a melting peak 11 included in the DSC curve 10, and a straight line 15 obtained by linearly extrapolating a base line 14 of the low temperature side included in the DSC curve 10, is defined as the melting temperature. A value obtained by dividing an area of a latent heat region 17 surrounded by the melting peak 11 and the straight line 15, by the weight of the cold storage material is defined as the amount of latent heat.

The solidification characteristics of the cold storage materials according to the Examples and Comparative Examples were evaluated. A thermocouple was inserted into 40 g of each of the cold storage materials according to the Examples and Comparative Examples, and the temperature was measured when each of the cold storage materials melted. Specifically, the temperature of each cold storage material was reduced from 25° C. to −35° C. at a rate of 1.0° C./min, the cold storage material was solidified at −35° C., and the change over time in the temperature of each cold storage material was measured using the thermocouple at one minute intervals. The solidification initiation temperature was obtained from the measurement results for the above freezing characteristics.

Figure 2:
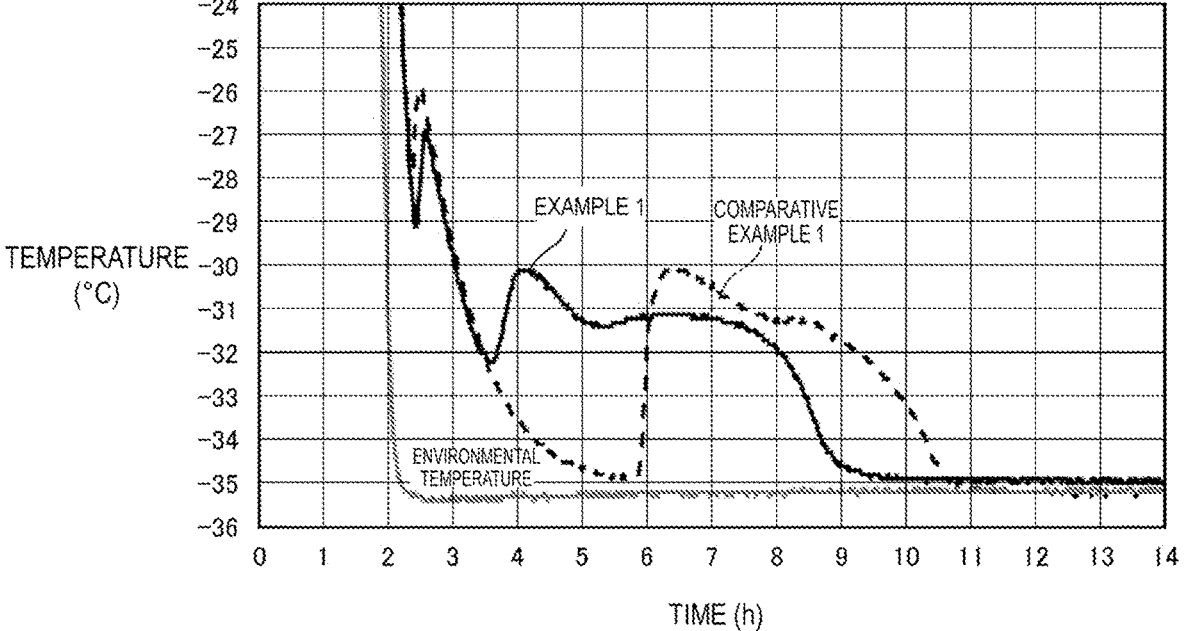
FIG. 2 is a diagram explaining a method of measuring a solidification initiation temperature of the cold storage material according to the example, and illustrates a temperature change of the cold storage material according to Example 1 and Comparative Example 1 with respect to the environmental temperature.

The method of determining the solidification initiation temperature of the cold storage material of the disclosure is explained. FIG. 2 is a diagram explaining a method of measuring the solidification initiation temperature of the cold storage materials according to the Examples. In the change over time in temperature of the cold storage materials shown in FIG. 2, after solidification heat is generated when the cold storage material freezes, the lowest temperature after freezing is completed and the temperature begins to decrease to the environmental temperature is regarded as the solidification initiation temperature. In Example 1, the solidification initiation temperature was −32° C.

A difference between the solidification initiation temperature obtained by evaluating the solidification characteristics and the melting temperature obtained by differential scanning calorimetry measurements is denoted by At.

Note that as Δt becomes smaller, the energy loss accompanying solidification becomes smaller, which is preferable. This is because solidification begins at a temperature closer to the melting temperature, solidification begins at an earlier time, and thereby the solidification time is shortened, and also because the temperature setting of the freezing environment can be further increased to the solidification initiation temperature.

The melting temperatures, amounts of latent heat, and solidification initiation temperatures of the Examples and Comparative Examples were measured by the methods described above. The results are shown in Tables 1 and 3 to 7.

Table 2 lists salts having a temperature dependence of saturated solubility in pure water that decreases by 30% or more at a water temperature from 20° C. to 0° C. Table 2 shows the solubility (mass (g) of the freezing point adjuster dissolved in 100 g of pure water) of each of the freezing point adjusters 1 to 8 at a water temperature of 20° C. and 0° C., and the decrease rate (%) obtained by dividing the difference between the solubility at the water temperature of 20° C. and the solubility at a water temperature 0° C. by the solubility at the water temperature of 20° C., and multiplying by 100.

TABLE 1

| | | Examples | | | | | | | | Comparative Examples | |
|---|---|---|---|---|---|---|---|---|---|---|---|
| | | 1 | 2 | 3 | 4 | 5 | 6 | 7 | 8 | 1 | 2 |
| Concentration (wt. %) | Sodium chloride | 13.7 | 13.7 | 13.7 | 13.7 | 13.7 | 13.7 | 13.7 | 13.7 | 13.0 | 13.1 |
| | Potassium chloride | 3.2 | 3.2 | 3.2 | 3.2 | 3.2 | 3.2 | 3.2 | 3.2 | 3.0 | 3.0 |
| | Ammonium chloride | 5.8 | 5.8 | 5.8 | 5.8 | 5.8 | 5.8 | 5.8 | 5.8 | 5.5 | 5.6 |
| | Urea | 9.5 | 9.5 | 9.5 | 9.5 | 9.5 | 9.5 | 9.5 | 9.5 | 9.0 | 9.1 |
| | Water | 67.9 | 67.9 | 67.9 | 67.9 | 67.9 | 67.9 | 67.9 | 67.9 | 69.5 | 69.2 |
| | $Na_2HPO_4 \cdot 12H_2O$ | 5.3 | — | — | — | — | — | — | — | — | — |
| | $Na_2SO_4 \cdot 10H_2O$ | — | 5.3 | — | — | — | — | — | — | — | — |
| | $K_2HPO_4$ | — | — | 5.3 | — | — | — | — | — | — | — |
| | $KH_2PO_4$ | — | — | — | 5.3 | — | — | — | — | — | — |
| | $K_2SO_4$ | — | — | — | — | 5.3 | — | — | — | — | — |
| | $AlK(SO_4)_2 \cdot 12H_2O$ | — | — | — | — | — | 5.3 | — | — | — | — |
| | $AlNH_4(SO_4)_2 \cdot 12H_2O$ | — | — | — | — | — | — | 5.3 | — | — | — |
| | $Na_2B_4O_7 \cdot 10H_2O$ | — | — | — | — | — | — | — | 5.3 | — | — |
| | Calcium carbonate | — | — | — | — | — | — | — | — | — | 1.0 |
| Characteristics | Latent heat (J/g) | 237 | 226 | 225 | 217 | 208 | 204 | 202 | 224 | 252 | 233 |
| | Melting temperature (° C.) | −28.5 | −28.5 | −28.6 | −31.2 | −28.2 | −29.8 | −29.8 | −29.5 | −28.6 | −28.5 |
| | Solidification initiation temperature (° C.) | −32 | −32 | −33 | −33 | −32 | −33 | −33 | −33 | −35 | −35 |
| | Δt (° C.) | 3.5 | 3.5 | 4.4 | 1.8 | 3.8 | 3.2 | 3.2 | 3.5 | 6.4 | 6.5 |

TABLE 2

| | | | Solubility (g/100 g water) | | |
|---|---|---|---|---|---|
| | | | Water temperature 0° C. | Water temperature 20° C. | Decrease rate (%) |
| Freezing point adjuster | 1 | Na$_2$HPO$_4$ · 12H$_2$O | 4.7 | 22.7 | 79.2 |
| | 2 | Na$_2$SO$_4$ · 10H$_2$O | 10.2 | 43.1 | 76.3 |
| | 3 | K$_2$HPO$_4$ | 83.0 | 150.0 | 44.7 |
| | 4 | KH$_2$PO$_4$ | 14.8 | 22.6 | 34.5 |
| | 5 | K$_2$SO$_4$ | 7.4 | 11.1 | 33.3 |
| | 6 | AlK(SO$_4$)$_2$ · 12H$_2$O | 5.5 | 10.8 | 49.2 |
| | 7 | AlNH$_4$(SO4)$_2$ · 12H$_2$O | 5.7 | 11.3 | 49.7 |
| | 8 | Na$_2$B$_3$O$_7$ · 10H$_2$O | 2.3 | 5.0 | 54.3 |

The cold storage materials according to Examples 1 to 8 each have a freezing point adjuster that is a salt (di-sodium hydrogen phosphate dodecahydrate, sodium sulfate decahydrate, di-potassium hydrogen phosphate, potassium di-hydrogen phosphate, potassium sulfate, potassium aluminum sulfate dodecahydrate, aluminum ammonium sulfate dodecahydrate, Na$_2$B$_3$O$_7$-decahydrate) in which a functional group is identical to a cation included in any of a plurality of types of inorganic salts, and the salt has a temperature dependence of saturated solubility in pure water that decreases by 30% or more at a water temperature from 20° C. to 0° C., and as shown in Table 1, each of the cold storage materials exhibited desirable results with a melting temperature in a range of −28° C. to −32° C., and a Δt of 4.4° C. or less.

Figure 3:
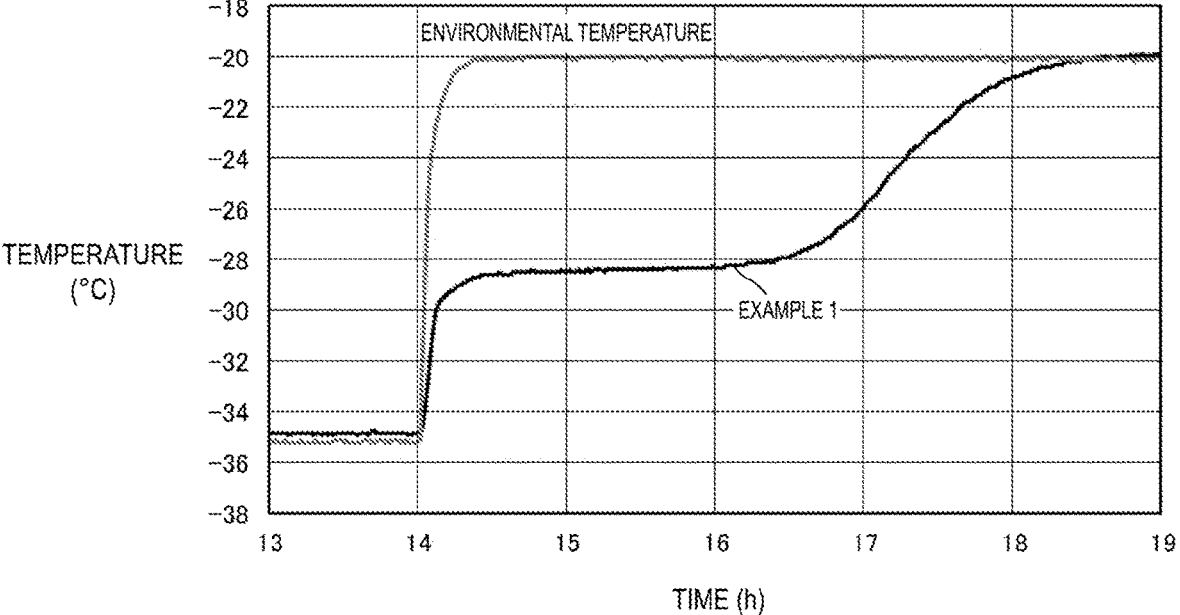
FIG. 3 is a diagram illustrating melting characteristics of the cold storage material of Example 1.

The melting characteristics of Example 1 are shown in FIG. 3. A thermocouple was inserted into 40 g of each cold storage material, and the temperature when the cold storage material melted was measured. Specifically, after each of the cold storage materials was caused to solidify at −35° C., then raised to −20° C., and melted, and changes over time in temperature of each of the cold storage materials were measured at one minute intervals using the thermocouple. Melting began at about −28.5° C. and ended at −28° C., and thus indicating the ability to maintain cold storage at a constant temperature.

Meanwhile, the melting temperatures of the cold storage materials of Comparative Examples 1 and 2 were in a range of −28° C. to −29° C., and Δt was 6.4° C. or higher. As shown in Table 2, the decrease rates of the freezing point adjusters of Examples 1 to 8 was 30% or higher, and with the large decrease rate, precipitation of the freezing point adjuster due to a decrease in water temperature was facilitated, supercooling was suppressed by the precipitated freezing point adjuster, and thereby Δt was reduced.

Furthermore, Examples 1 to 8 have a freezing point adjuster having a functional group that is common with the melting point adjuster, and thus through a common ion effect, precipitation of the freezing point adjuster was promoted, and Δt was reduced.

TABLE 3

| | | Examples | | | | | | | | | | | | Comparative Examples |
|---|---|---|---|---|---|---|---|---|---|---|---|---|---|---|
| | | 9 | 10 | 11 | 12 | 13 | 14 | 15 | 16 | 17 | 18 | 19 | 20 | 3 |
| Concentration (wt. %) | Sodium chloride | 5.3 | 10.5 | 13.7 | 15.8 | 21.1 | 13.7 | 13.7 | 13.7 | 13.7 | 13.7 | 13.7 | 13.7 | — |
| | Potassium chloride | 3.2 | 3.2 | 3.2 | 3.2 | 3.2 | 1.1 | 3.2 | 5.3 | 3.2 | 3.2 | 3.2 | 3.2 | 3.2 |
| | Ammonium chloride | 5.8 | 5.8 | 5.8 | 5.8 | 5.8 | 5.8 | 5.8 | 5.8 | 1.1 | 5.3 | 5.8 | 10.5 | 5.8 |
| | Urea | 9.5 | 9.5 | 9.5 | 9.5 | 9.5 | 9.5 | 9.5 | 9.5 | 9.5 | 9.5 | 9.5 | 9.5 | 9.5 |
| | Water | 76.3 | 71.1 | 67.9 | 65.8 | 60.5 | 70.0 | 67.9 | 65.8 | 72.6 | 68.4 | 67.9 | 63.2 | 81.6 |
| | Na$_2$HPO$_4$•12H$_2$O | 5.3 | 5.3 | 5.3 | 5.3 | 5.3 | 5.3 | 5.3 | 5.3 | 5.3 | 5.3 | 5.3 | 5.3 | 5.3 |
| Characteristics | Latent heat (J/g) | 250 | 241 | 237 | 221 | 205 | 237 | 237 | 230 | 233 | 240 | 237 | 203 | 293 |
| | Melting temperature (° C.) | −28.2 | −28.2 | −28.5 | −28.6 | −28.6 | −28.7 | −28.5 | −28.5 | −27.8 | −28.4 | −28.5 | −28.3 | −24.5 |
| | Solidification initiation temperature (° C.) | −30 | −33 | −33 | −32 | −32 | −32 | −32 | −32 | −29 | −31 | −31 | −33 | −26 |
| | Δt (° C.) | 1.8 | 4.8 | 4.5 | 3.4 | 3.4 | 3.3 | 3.5 | 3.5 | 1.2 | 2.6 | 2.5 | 4.7 | 1.5 |

As shown in Table 3, the melting temperatures of the cold storage materials of Examples 9 to 20 were in a range of −27° C. to −29° C., and Δt was 4.8° C. or lower, and thus desirable results were obtained. Thus, the cold storage materials of Examples 9 to 20 can reduce energy loss and more efficiently keep frozen foods col.

On the other hand, the melting temperature of the cold storage material of Comparative Example 3, which did not contain sodium in the cations of the plurality of types of inorganic salts, was −24.5° C., Δt was 1.5° C. or lower, and the melting temperature was higher than −26° C. That is, with the cold storage materials of the Examples, it is important that at least sodium be included in the cations of the plurality of types of inorganic salts.

TABLE 4

| | | Examples | | | | | |
| --- | --- | --- | --- | --- | --- | --- | --- |
| | | 21 | 22 | 23 | 24 | 25 | 26 |
| Concentration (wt. %) | Sodium chloride | 13.8 | 13.8 | 13.8 | 13.8 | 13.8 | 13.8 |
| | Potassium chloride | 3.2 | 3.2 | 3.2 | 3.2 | 3.2 | 3.2 |
| | Ammonium chloride | 5.9 | 5.9 | 5.9 | 5.9 | 5.9 | 5.9 |
| | Urea | 1.1 | 5.3 | 7.4 | 8.5 | 9.6 | 16.0 |
| | Water | 76.1 | 71.8 | 69.7 | 68.6 | 67.6 | 61.2 |
| | $Na_2HPO_4 \cdot 12H_2O$ | 6.4 | 6.4 | 6.4 | 6.4 | 6.4 | 6.4 |
| Characteristics | Latent heat (J/g) | 236 | 238 | 232 | 232 | 232 | 225 |
| | Melting temperature (° C.) | −27.1 | −28.4 | −28.4 | −28.6 | −28.5 | −28.4 |
| | Solidification initiation temperature (° C.) | −31 | −32 | −31 | −31 | −32 | −32 |
| | Δt (° C.) | 3.9 | 3.6 | 2.6 | 2.4 | 3.5 | 3.6 |

As shown in Table 4, the melting temperatures of the cold storage materials of Examples 21 to 26 were in a range of −27° C. to −29° C., and Δt was 3.9° C. or lower, and thus desirable results were obtained. Thus, the cold storage materials of Examples 21 to 26 can reduce energy loss and more efficiently keep frozen foods cool.

TABLE 5

| | | Examples | | | | | |
| --- | --- | --- | --- | --- | --- | --- | --- |
| | | 27 | 28 | 29 | 30 | 31 | 32 |
| Concentration (wt. %) | Sodium chloride | 13.3 | 13.5 | 13.8 | 13.3 | 13.5 | 14.4 |
| | Potassium chloride | 3.1 | 3.1 | 3.2 | 3.1 | 3.1 | 3.3 |
| | Ammonium chloride | 5.6 | 5.7 | 5.9 | 5.6 | 5.7 | 6.1 |
| | Urea | 9.2 | 9.4 | 9.6 | 9.2 | 9.4 | 10.0 |
| | Water | 68.9 | 68.2 | 67.6 | 68.9 | 68.2 | 66.1 |
| | $Na_2HPO_4 \cdot 12H_2O$ | 2.0 | 4.2 | 6.4 | — | — | — |
| | $Na_2SO_4 \cdot 10H_2O$ | — | — | — | 2.0 | 4.2 | 11.1 |
| Characteristics | Latent heat (J/g) | 236 | 233 | 232 | 233 | 227 | 206 |
| | Melting temperature (° C.) | −28.6 | −28.4 | −28.5 | −28.6 | −28.6 | −28.5 |
| | Solidification initiation temperature (° C.) | −33 | −32 | −31 | −33 | −32 | −32 |
| | Δt (° C.) | 4.4 | 3.6 | 2.5 | 4.4 | 3.4 | 3.5 |

As shown in Table 5, the melting temperatures of the cold storage materials of Examples 27 to 32 were in a range of −28° C. to −29° C., and Δt was 4.4° C. or lower, and thus desirable results were obtained. Thus, the cold storage materials of Examples 27 to 32, in which the freezing point adjuster was contained from 2 to 12 wt. % for 100 wt. % of the cold storage material main agent, can reduce energy loss and more efficiently keep frozen foods cool.

TABLE 6

| | | Examples | | | | | | | | |
| --- | --- | --- | --- | --- | --- | --- | --- | --- | --- | --- |
| | | 33 | 34 | 35 | 36 | 37 | 38 | 39 | 40 | 41 |
| Concentration (wt. %) | Sodium chloride | 13.7 | 14.2 | 14.7 | 15.3 | 15.8 | 14.4 | 14.6 | 14.7 | 15.6 |
| | Potassium chloride | — | — | — | — | — | — | — | — | — |
| | Ammonium chloride | 5.8 | 6.3 | 6.3 | 6.3 | 6.3 | 6.2 | 6.3 | 6.3 | 6.7 |
| | Urea | 9.5 | 10.0 | 10.0 | 10.0 | 10.0 | 9.8 | 9.9 | 10.0 | 10.6 |
| | Water | 71.1 | 69.5 | 68.9 | 68.4 | 67.9 | 69.6 | 69.3 | 68.9 | 67.2 |
| | $Na_2HPO_4 \cdot 12H_2O$ | 5.3 | 5.3 | 5.3 | 5.3 | 5.3 | — | — | — | — |
| | $Na_2SO_4 \cdot 10H_2O$ | — | — | — | — | — | 3.1 | 4.2 | 5.3 | 11.1 |

TABLE 6-continued

|  |  | Examples | | | | | | | | |
| --- | --- | --- | --- | --- | --- | --- | --- | --- | --- | --- |
|  |  | 33 | 34 | 35 | 36 | 37 | 38 | 39 | 40 | 41 |
| Characteristics | Latent heat (J/g) | 227 | 232 | 231 | 230 | 221 | 234 | 234 | 227 | 221 |
|  | Melting temperature (° C.) | −27.4 | −27.5 | −27.6 | −27.5 | −27.5 | −27.6 | −27.7 | −27.7 | −27.6 |
|  | Solidification initiation temperature (° C.) | −31 | −31 | −31 | −30 | −30 | −32 | −32 | −30 | −30 |
|  | Δt (° C.) | 3.6 | 3.5 | 3.4 | 2.46 | 2.5 | 4.4 | 4.3 | 2.3 | 2.4 |

As shown in Table 6, the melting temperatures of the cold storage materials of Examples 33 to 41 were in a range of −27° C. to −28° C., and Δt was 4.4° C. or lower, and thus desirable results were obtained. Thus, the cold storage materials of Examples 33 to 41 can reduce energy loss and more efficiently keep frozen foods cool.

TABLE 7

|  |  | Examples | | | | | |
| --- | --- | --- | --- | --- | --- | --- | --- |
|  |  | 42 | 43 | 44 | 45 | 46 | 47 |
| Concentration (wt. %) | Sodium chloride | 10.5 | 13.7 | 18.9 | 13.7 | 13.4 | 14.4 |
|  | Potassium chloride | 3.2 | 3.2 | 3.2 | 6.3 | 3.1 | 3.3 |
|  | Ammonium chloride | — | — | — | — | — | — |
|  | Urea | 9.5 | 9.5 | 9.5 | 9.5 | 9.3 | 10.0 |
|  | Water | 76.8 | 73.7 | 68.4 | 70.5 | 74.2 | 72.2 |
|  | $Na_2HPO_4 \cdot 12H_2O$ | 5.3 | 5.3 | 5.3 | 5.3 | 3.1 | 11.1 |
| Characteristics | Latent heat (J/g) | 240 | 236 | 232 | 230 | 237 | 223 |
|  | Melting temperature (° C.) | −26.0 | −26.0 | −26.1 | −26.2 | −26.0 | −26.2 |
|  | Solidification initiation temperature (° C.) | −28 | −28 | −29 | −29 | −30 | −28 |
|  | Δt (° C.) | 2 | 2 | 2.9 | 2.8 | 4 | 1.8 |

As shown in Table 7, the melting temperatures of the cold storage materials of Examples 42 to 47 were in a range of −26° C. to −27° C., and Δt was 4.0° C. or lower, and thus desirable results were obtained. Thus, the cold storage materials of Examples 42 to 47 can reduce energy loss and more efficiently keep frozen foods cool.

Note that an example of a conceivable cold storage tool in which the above-described cold storage material is used is a cold storage tool provided with an accommodation portion that accommodates the above-described cold storage material in a liquid-tight manner. Through this cold storage tool, the product to be cooled can be effectively kept cool. Alternatively, the cold storage tool may have the above-described cold storage material and a plurality of accommodation portions that accommodate the cold storage material in a liquid-tight manner, and also have joint parts connecting the plurality of accommodation portions to each other. Equipment provided with these cold storage tools can be applied, for example, to logistics packing containers, human body cooling tools, beverage cooling equipment, and food cooling equipment for ice creams, cakes with a large amount of fresh cream, and other food products. Note that the cold storage tool may be made to contact at least a portion of the product to be cooled, and cover the product to be cooled to keep it cool, or may cover the upper and lower surfaces and side surfaces of the product to be cooled to keep it cool.

From the above, the cold storage material according to the disclosure can provide the cold storage material by which frozen foods and products to be cooled such as ice creams and cakes with a large amount of fresh cream that particularly need to be kept at a low temperature can be kept cool for a long period of time, the cold storage material having a solidification initiation temperature of −35° C. or higher.

Although each embodiment and example of the disclosure has been described in detail above, it will be understood by those skilled in the art that many modifications that do not substantively depart from the new matters and effects of the disclosure can be made.

Accordingly, all such modified examples are included in the scope of the disclosure.

For example, a term that is described at least once in the specification or drawings along with a different term of a broader or synonymous may be replaced with the different term anywhere in the specification or drawings. The composition and operation of the cold storage material are also not limited to those described in each embodiment and example of the disclosure, and various modifications can be made.

INDUSTRIAL APPLICABILITY

The cold storage material according to the disclosure relates to a heat storage material that uses latent heat during solidification and melting. The cold storage material according to the disclosure can be widely used as a cold storage material that stores the energy required for transporting and storing frozen foods and can be taken out at a constant temperature. This cold storage material is used by being filled into a container and frozen in advance.

The invention claimed is:

1. A cold storage material, comprising:

a cold storage material main agent formed from water and a melting point adjuster; and a freezing point adjuster, wherein:

the melting point adjuster includes a plurality of types of inorganic salts and an organic compound, anions of the plurality of types of inorganic salts are all chlorine, cations of the plurality of types of inorganic salts include at least sodium, the freezing point adjuster is a salt including a functional group that is identical to a cation included in any of the plurality of types of inorganic salts, the salt having a temperature dependence, of saturated solubility in pure water, that decreases by 30% or more at a water temperature from 20° C. to 0° C., the organic compound is urea, and a difference between a main melting point and a solidification initiation temperature is within 5° C.

2. The cold storage material according to claim 1, wherein the freezing point adjuster is a salt having a temperature dependence, of saturated solubility in pure water, that decreases by 50% or more at the water temperature from 20° C. to 0° C.

3. The cold storage material according to claim 2, wherein;

a proportion of the cold storage material main agent in the cold storage material is from 8 to 12 wt. %, a proportion of the melting point adjuster in the cold storage material main agent is from 20 to 30 wt. %, the cations of the plurality of types of inorganic salts further include potassium, a proportion of sodium chloride in the cold storage material main agent is from 10 to 18 wt. %, and a proportion of potassium chloride in the cold storage material main agent is from 3 to 6 wt. %, a total amount of the plurality of types of inorganic salts in the cold storage material is in a range of 15 to 20 wt. %, the organic compound is the urea contained in an amount of 8 to 12 wt. % for 100 wt. % of the cold storage material, and the main melting point is from −26° C. to −27° C.

4. The cold storage material according to claim 3, wherein the freezing point adjuster is contained in an amount of 3 to 12 wt. % for 100 wt. % of the cold storage material main agent.

5. The cold storage material according to claim 1, wherein the freezing point adjuster is a salt having a saturated solubility of 11 g or less in pure water at a water temperature of 0° C.

6. The cold storage material according to claim 1, wherein the cations of the plurality of types of inorganic salts further include potassium.

7. The cold storage material according to claim 1, wherein the freezing point adjuster is a double salt including an ammonium group and having a temperature dependence, of saturated solubility in pure water, that decreases by 40% or more at the water temperature from 20° C. to 0° C.

8. A cold storage material comprising:

a cold storage material main agent formed from water and a melting point adjuster; and a freezing point adjuster, wherein:

the melting point adjuster includes a plurality of types of inorganic salts and an organic compound, anions of the plurality of types of inorganic salts are all chlorine, cations of the plurality of types of inorganic salts include at least sodium, the freezing point adjuster is a salt including a functional group that is identical to a cation included in any of the plurality of types of inorganic salts, the salt having a temperature dependence, of saturated solubility in pure water, that decreases by 30% or more at a water temperature from 20° C. to 0° C., a difference between a main melting point and a solidification initiation temperature is within 5° C., a proportion of the cold storage material main agent in the cold storage material is from 1 to 18 wt. %, a proportion of the melting point adjuster in the cold storage material main agent is from 25 to 40 wt. %, the cations of the plurality of types of inorganic salts further include potassium and an ammonium group, the cold storage material main agent contains 5 to 25 wt. % of sodium chloride, 1 to 6 wt. % of potassium chloride, and 1 to 12 wt. % of ammonium chloride, a total amount of the plurality of types of inorganic salts in the cold storage material is from 13 to 35 wt. %, the organic compound is urea contained in an amount of 1 to 16 wt. % for 100 wt. % of the cold storage material, and the main melting point is from −27° C. to −32° C.

9. The cold storage material according to claim 8, wherein the freezing point adjuster is contained in an amount of 2 to 12 wt. % for 100 wt. % of the cold storage material main agent, and the solidification initiation temperature is −35° C. or higher.

10. A cold storage material comprising:

a cold storage material main agent formed from water and a melting point adjuster; and a freezing point adjuster, wherein:

the melting point adjuster includes a plurality of types of inorganic salts and an organic compound, anions of the plurality of types of inorganic salts are all chlorine, cations of the plurality of types of inorganic salts include at least sodium, the freezing point adjuster is a salt including a functional group that is identical to a cation included in any of the plurality of types of inorganic salts, the salt having a temperature dependence, of saturated solubility in pure water, that decreases by 30% or more at a water temperature from 20° C. to 0° C., a difference between a main melting point and a solidification initiation temperature is within 5° C., a proportion of the cold storage material main agent in the cold storage material is from 8 to 12 wt. %, a proportion of the melting point adjuster in the cold storage material main agent is from 30 to 40 wt. %, the cations of the plurality of types of inorganic salts further include an ammonium group, the cold storage material main agent contains 10 to 18 wt. % of sodium chloride, and 5 to 10 wt. % of ammonium chloride, the contained sodium chloride is greater than the contained ammonium chloride,

a total amount of the plurality of types of inorganic salts in the cold storage material is from 18 to 25 wt. %, the organic compound is urea contained in an amount of 8 to 12 wt. % for 100 wt. % of the cold storage material, and the main melting point is from −27° C. to −28° C.

11. The cold storage material according to claim 10, wherein the freezing point adjuster is contained in an amount of 3 to 12 wt. % for 100 wt. % of the cold storage material main agent.

\* \* \* \* \*